US010383348B2

(12) United States Patent
Bocks et al.

(10) Patent No.: US 10,383,348 B2
(45) Date of Patent: Aug. 20, 2019

(54) VACUUM DRAWER FOR VACUUMIZING FOODSTUFFS WITH ACTUATABLE LID

(71) Applicant: MICHATEK, k.s., Michalovce (SK)

(72) Inventors: Stefan Bocks, Frasdorf (DE); Robert Kofler, Schwoich (AT); Alexander Weweck, Prutting (DE); Florian Harlander, Niederndorf (AT); Peter Kopfensteiner, Ebbs (AT)

(73) Assignee: MICHATEK, k.s., Michalovce (SK)

( * ) Notice: Subject to any disclaimer, the term of this patent is extended or adjusted under 35 U.S.C. 154(b) by 543 days.

(21) Appl. No.: 15/028,281

(22) PCT Filed: Oct. 22, 2015

(86) PCT No.: PCT/EP2015/002095
§ 371 (c)(1),
(2) Date: Apr. 8, 2016

(87) PCT Pub. No.: WO2016/062406
PCT Pub. Date: Apr. 28, 2016

(65) Prior Publication Data
US 2016/0324196 A1 Nov. 10, 2016

(30) Foreign Application Priority Data

Oct. 24, 2014 (DE) .................. 10 2014 015 788

(51) Int. Cl.
*A23L 3/015* (2006.01)
*B65B 31/02* (2006.01)
(Continued)

(52) U.S. Cl.
CPC ............ *A23L 3/015* (2013.01); *A47F 7/0071* (2013.01); *B65B 31/024* (2013.01);
(Continued)

(58) Field of Classification Search
CPC ....... B65B 31/02; B65B 31/024; B65D 81/20; B65D 81/2007; B65D 81/2015;
(Continued)

(56) References Cited

U.S. PATENT DOCUMENTS 4,127,765 A * 11/1978 Heaney ................. A47F 3/0434
219/218
4,145,844 A * 3/1979 Kaspar .................... A47F 3/043
403/231
(Continued)

FOREIGN PATENT DOCUMENTS

EP   0 405 680 A2   1/1991
EP   2 062 823 A1   5/2009
(Continued)

OTHER PUBLICATIONS

The Family Handyman figures and article published prior to Oct. 23, 2014 (https://www.familyhandyman.com/windows/window-repair/how-to-replace-insulating-glass/view-all/).*

*Primary Examiner* — Gloria R Weeks
*Assistant Examiner* — Dariush Seif
(74) *Attorney, Agent, or Firm* — Dilworth & Barrese, LLP

(57) ABSTRACT

A vacuum drawer for vacuumizing foodstuffs with a vacuum chamber is closed by an actuatable lid at least partly is made of glass, with the glass part of the lid having two or more laminated glass panes which are arranged to at least partly overlap each other face to face.

17 Claims, 5 Drawing Sheets

(51) Int. Cl.
*A47F 7/00* (2006.01)
*B65D 81/20* (2006.01)
*A47B 77/08* (2006.01)
*B65B 51/14* (2006.01)
*A47B 77/16* (2006.01)

(52) U.S. Cl.
CPC .......... *B65D 81/2007* (2013.01); *A47B 77/08* (2013.01); *A47B 77/16* (2013.01); *A47B 2210/08* (2013.01); *B65B 51/146* (2013.01); *B65B 51/148* (2013.01)

(58) Field of Classification Search
CPC ....... A47B 77/16; A47B 2210/08; A23L 5/17; A23L 3/015; E05D 3/02; E06B 3/6617; E06B 5/164
USPC .......................... 53/510, 512, 79; 16/221–392
See application file for complete search history.

(56) References Cited

U.S. PATENT DOCUMENTS

| | | | | |
|---|---|---|---|---|
| 4,223,482 A * | 9/1980 | Barroero | ................ | A47F 3/043 16/75 |
| 5,046,332 A * | 9/1991 | Herrmann | ............. | A23L 3/3418 62/388 |
| 5,095,717 A * | 3/1992 | Germi | ................... | F25D 17/042 417/313 |
| 5,113,628 A * | 5/1992 | Richardson | ............. | A47F 3/043 312/405 |
| 5,363,611 A * | 11/1994 | Richardson | ............. | A47F 3/043 312/116 |
| 5,687,509 A * | 11/1997 | Barroero | ................ | A47F 3/043 16/308 |
| 6,148,563 A * | 11/2000 | Roche | ................... | A47F 3/0434 49/501 |
| 6,148,875 A * | 11/2000 | Breen | ................... | B65B 25/046 141/192 |
| 8,074,302 B1 * | 12/2011 | Kook | ..................... | A47K 13/12 16/365 |
| 8,402,775 B2 * | 3/2013 | Espinosa | ................. | A47F 3/001 62/268 |
| 8,915,093 B2 * | 12/2014 | Espinosa | ................. | A47F 3/001 62/100 |
| 9,052,536 B2 * | 6/2015 | Artwohl | ................ | A47F 3/0434 |
| 9,510,615 B2 * | 12/2016 | Espinosa | ................. | A47F 3/001 |
| 9,526,353 B2 * | 12/2016 | Chubb | ................. | A47F 3/0434 |
| 9,725,940 B2 * | 8/2017 | Lambright | ............. | E05F 1/123 |
| 2004/0031245 A1 * | 2/2004 | Kingeter | ................ | B65B 31/02 53/510 |
| 2004/0040961 A1 * | 3/2004 | Vilalta | ............... | B65D 51/1683 220/212 |
| 2006/0117763 A1 * | 6/2006 | Espinosa | ................. | A47F 3/001 62/78 |
| 2008/0295285 A1 * | 12/2008 | Clymer | ................. | E05D 7/1022 16/223 |
| 2008/0302253 A1 * | 12/2008 | Salvaro | ................... | F24C 15/00 99/325 |
| 2014/0008374 A1 * | 1/2014 | Lubart | ............... | B65D 81/2015 220/592.27 |
| 2014/0026502 A1 * | 1/2014 | Carbary | ............... | E06B 3/5427 52/235 |
| 2014/0065329 A1 * | 3/2014 | Showers | ............... | E06B 3/6715 428/34 |
| 2014/0075889 A1 * | 3/2014 | Avrech | ................... | B65B 31/04 53/432 |
| 2017/0150867 A1 * | 6/2017 | Flores | ................. | A47L 15/4257 |
| 2018/0141738 A1 * | 5/2018 | Armano | ................ | B65D 81/20 |

FOREIGN PATENT DOCUMENTS

JP 2010-267750 A 11/2010
WO 02/10017 A1 2/2002

* cited by examiner

Fig. 1
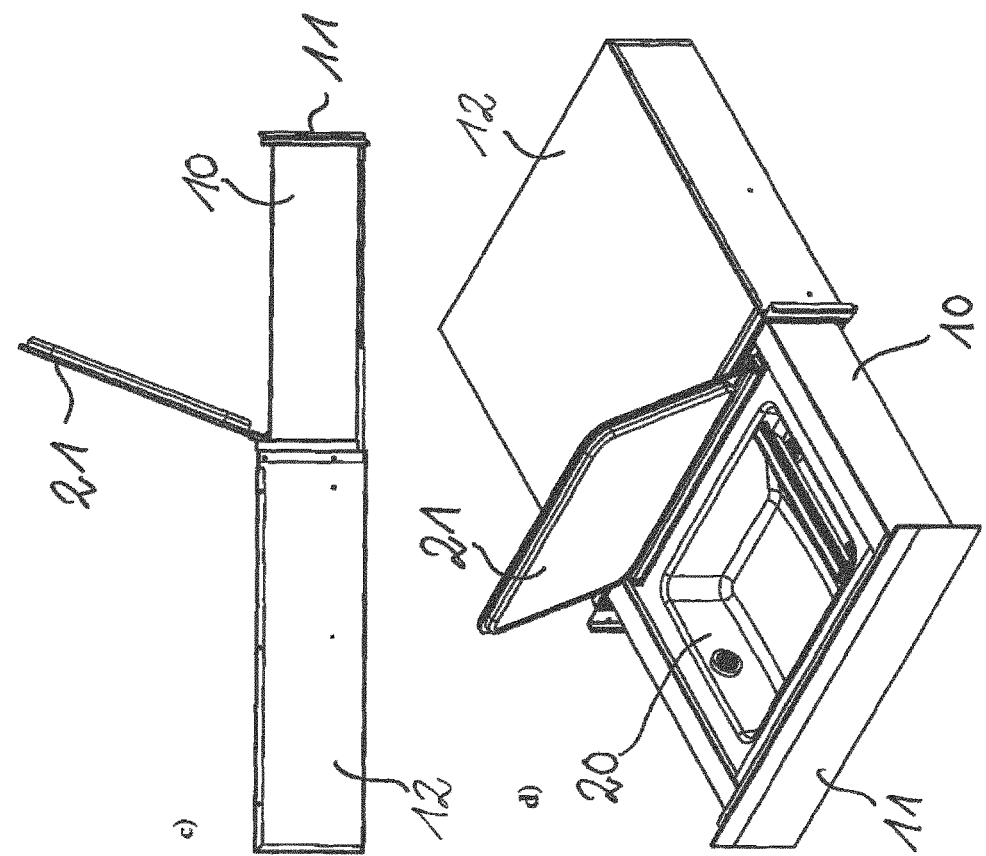
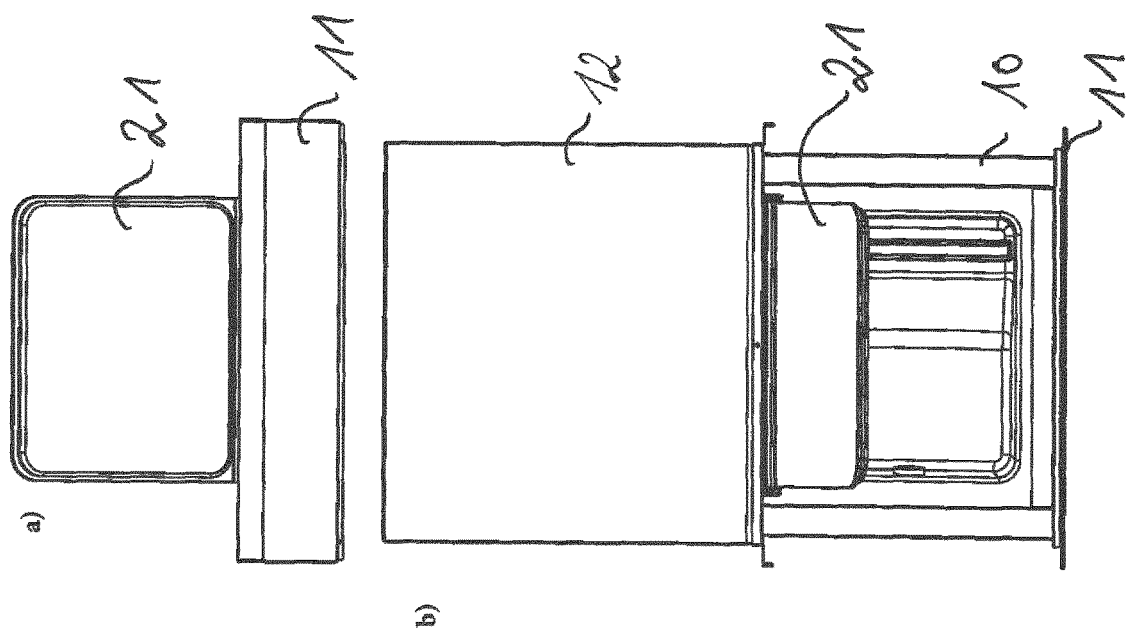

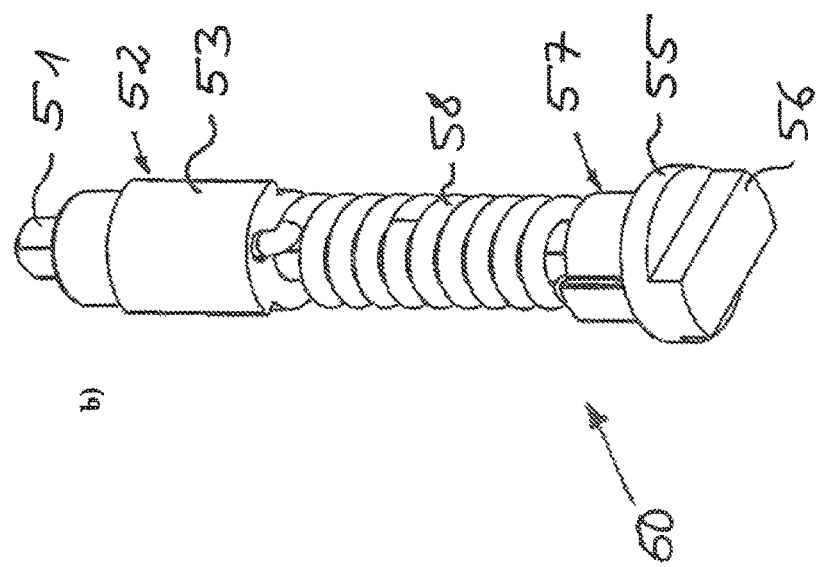
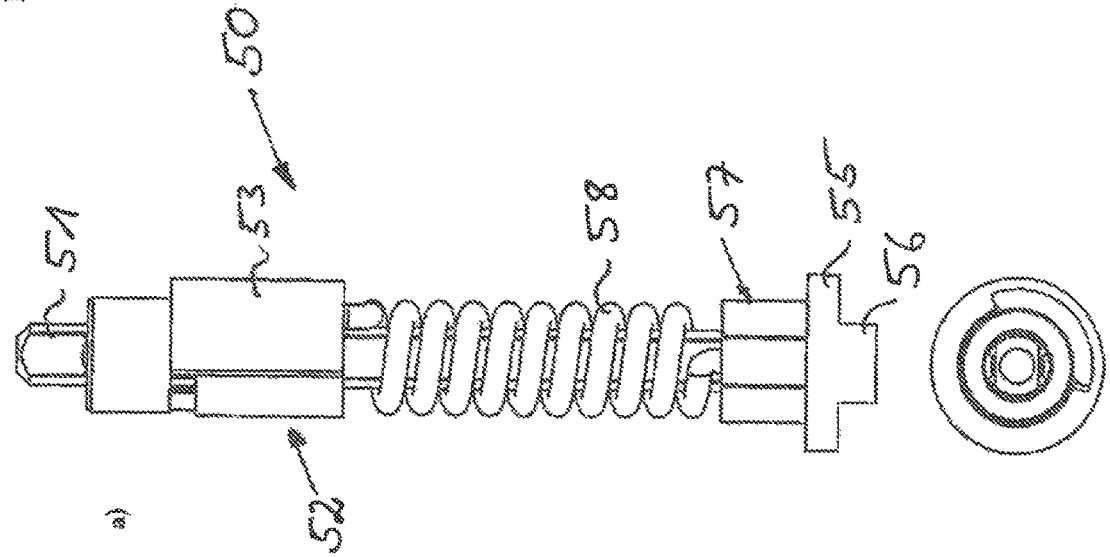
Fig. 4

Fig. 5
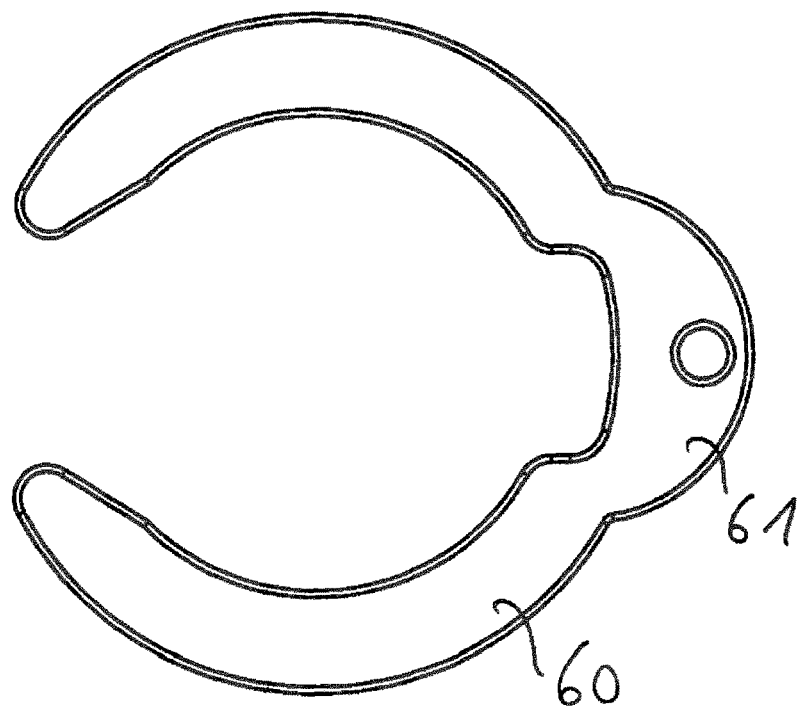
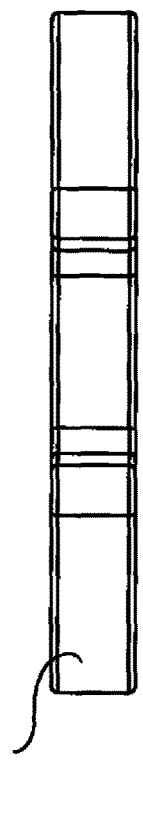
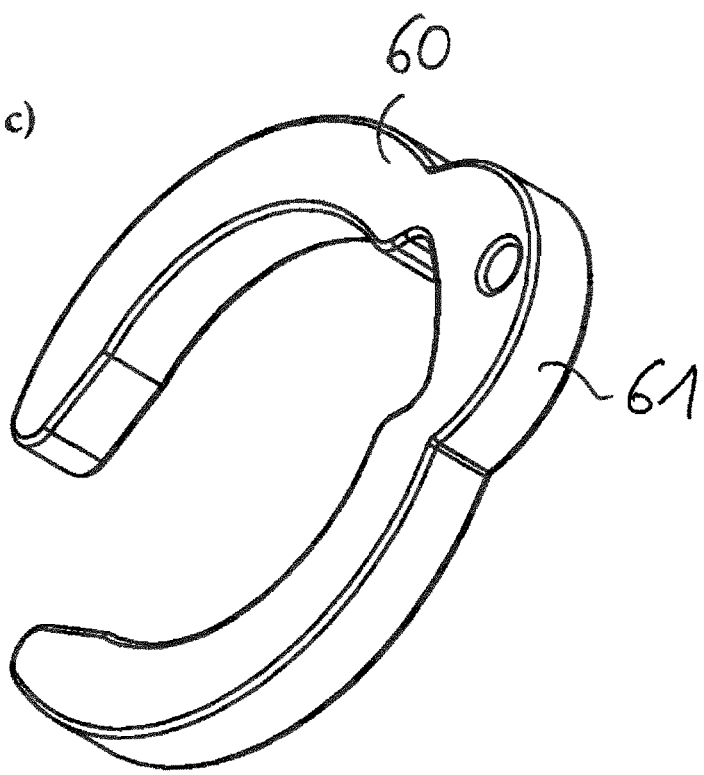

VACUUM DRAWER FOR VACUUMIZING FOODSTUFFS WITH ACTUATABLE LID

BACKGROUND OF THE INVENTION

This invention relates to a vacuum drawer for vacuumizing foodstuffs with a vacuum chamber which is to be closed airtight by an actuatable lid, wherein the lid is at least partly made of glass.

Vacuumizers comprise a vacuum chamber into which a suitable container, for example in the form of a sealable bag, is inserted. Within the chamber a welding bar extends, which is height-adjustable in vertical direction. The container filled with the foodstuff is inserted into the vacuum chamber and the same subsequently is closed airtight by means of a lid, in order to generate a vacuum in the chamber by means of a vacuum pump. The subsequently actuated welding bar welds the container by supplying welding energy.

What is also known are vacuumizers designed especially for use in drawers, in particular kitchen cabinets. For design reasons, in particular in use of the vacuum drawer for kitchen cabinets, it is desirable that the lid of the vacuumizer is at least partly made of glass. The use of a glass lid, however, involves the risk of pane breakage, which in the presence of a chamber vacuum can lead to implosion due to the pressure difference. Due to the impact on the chamber wall, the fragments getting into the vacuum chamber can be flung back and become a danger for nearby persons or objects.

So far, various considerations have been made to reduce the described risk. The use of a plastic lid, for example made of Plexiglas, however does not satisfy the demands placed on the design of the appliance. In addition, an enormous thickness of the Plexiglas would be necessary, whereby usable chamber volume would get lost disadvantageously. The use of known shatter protection films offers no sufficient strength. In addition, such films adhere to glass only unsatisfactorily, so that here as well dangerous shattering can occur in the case of pane breakage.

SUMMARY OF THE INVENTION

The object of the present invention consists in indicating an alternative variant to the formation of the lid of a vacuum drawer, which satisfies the safety requirements discussed above.

This object is solved by a vacuum drawer according to the features herein. According to the invention there is used a lid made of glass or at least comprising a glass part, wherein the glass part of the lid comprises two or more laminated glass panes which are arranged to a least partly overlap each other face to face. The glass panes preferably are arranged such that each intact glass pane as such closes the vacuum chamber airtight or air can enter into the chamber only very slowly. The advantage of the system according to the invention consists in that even in the case of breakage of one of the panes used the vacuum is held by the at least one intact pane and a dangerous implosion, which would lead to uncontrolled shattering of a broken glass pane, is avoided.

Preferably, the lid almost completely is formed of two overlapping glass panes. Necessary components such as seals, hinges or edge trims can be formed of different materials. The shape of the glass panes therefore substantially defines the shape of the lid.

The two or more glass panes can be connected, preferably bonded to each other, face to face. The connection, in particular bonding, can be face to face or point by point. Bonding also can be effected via a contour at the edge. The two or adjacent glass panes can be connected with each other or fixed to each other with a distance. Spacing can be effected via one or more spacers or spacer profiles inserted between adjacent glass panes. The glass panes arranged at a distance can be fixed to each other by means of bonding or be fixed against each other by means of vacuum within the cavity formed between adjacent glass panes. In the latter case, the glass panes only are fixed by the existing vacuum. What is of course also conceivable is a mixture of vacuum fixation and bonding of the glass panes. What likewise is conceivable is bonding of the glass panes by means of a double-sided adhesive tape, in particular with a thickness of at least 1 mm, preferably at least 2 mm, so that the glass panes are spaced from each other.

The cavity between the glass panes likewise can be filled with an inert gas, so that the panes permanently remain highly transparent and translucent.

The spaced arrangement of the at least two glass panes has the advantage that a groove at least partly is obtained at the edge, which is suitable for accommodating one or more seals, in particular sealing lips. Fixing the necessary seal between lid and chamber so far has been complicated and unsatisfactory, as a groove for accommodating the seal could not be milled at the tray of the chamber in an economically expedient way. The same previously has applied when using a conventional glass lid with simple glass pane. The use of at least two glass plates and their spaced arrangement creates space for accommodating a seal also without a milling operation. The resulting groove at the edge provides for easy mounting of a replaceable clamping profile in the form of a lip seal on the lid.

Mounting the lid on the vacuum chamber preferably can be effected via one or more rotary hinges. According to one embodiment the rotary hinges are spring-supported, in order to either hold the lid in a position or to automatically open or close the same by the pretension generated by spring force. Ideally, the articulation of the lid is effected by means of rotary hinges laterally attached to the lid edge. What is expedient is the use of two rotary hinges which each are arranged at the edge on opposite sides of the lid.

What also turns out to be expedient is a releasable attachment of the stationary hinge part of the at least one rotary hinge to the chamber body. The releasable arrangement allows the easy disassembly of the lid, for example for cleaning or repair purposes. The releasable connection preferably can be effected in the form of a tab formed at the chamber body, into which the rotary hinge can non-rotatably be hung in and be removed when needed.

It is preferred particularly when at least one rotary hinge is characterized by an axial clearance in direction of the axis of rotation, in order to remove the rotary hinge from the tab of the chamber body for disassembly of the lid by means of an axial movement. Particularly preferably, both rotary hinges arranged at the edge of the lid have an axial clearance, so that the same are movable relative to each other.

To secure the lid at the body and to prevent that the lid is demounted by mistake, at least one slide is provided, in order to limit or completely block the axial clearance of the at least one hinge. The slide preferably is designed like a clamp and can be put onto the rotary shaft at the lid in the region of the rotary hinge. A handle-like formation of the slide can serve as handle, in order to conveniently withdraw the slide from the hinge shaft for the succeeding disassembly of the lid. Ideally, a separate slide is provided for the rotary hinges with axial clearance. The slide can be made of an elastic or flexible material.

According to a particularly preferred aspect of the invention the hinge attachment to the lid can be effected by means of a tubular profile which is attached to the edge of the glass panes adjoining the axis of rotation of the lid. The tube openings at the end ideally serve for accommodating one rotary hinge each. The attachment of the tubular profile to the lid preferably can be realized by means of two flanks protruding in parallel, which form a groove-like opening along the longitudinal axis of the tube. Accordingly, the profile can be put onto the edge of at least one glass pane. It likewise is conceivable that two or more overlapping glass panes are connected with the profile.

Another aspect of the invention relates to the use of the vacuum drawer according to the invention for a piece of furniture, in particular for a kitchen cabinet. Furthermore, the invention comprises a kitchen cabinet with the vacuum drawer according to the invention. Both for the use according to the invention and for the kitchen cabinet according to the invention the above-discussed advantages and properties apply, which have already been discussed in detail in connection with the vacuum drawer according to the invention or an advantageous aspect of the same. A repetitive description will be omitted for this reason.

BRIEF DESCRIPTION OF THE DRAWINGS

Further advantages and properties of the invention will be explained in detail below with reference to an exemplary embodiment illustrated in the drawings, in which:

FIG. 1: shows various representations of the vacuum drawer according to the invention, FIG. 4: shows two representations of the rotary hinges used, and FIG. 5: shows different representations of the slide for limiting the axial clearance of the rotary hinges.

DESCRIPTION OF THE PREFERRED EMBODIMENTS

Figure 2:
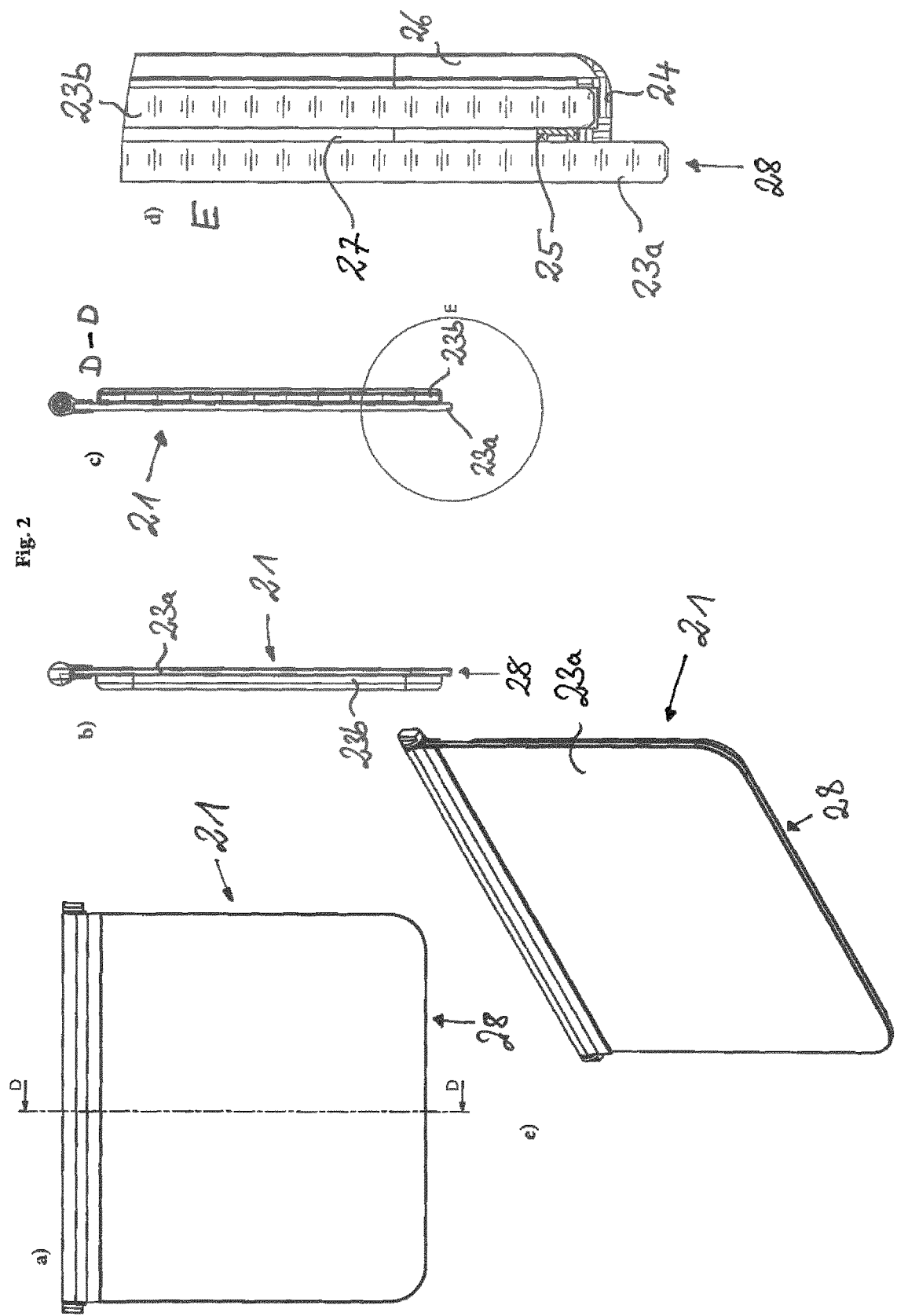
FIG. 2: shows detail representations of the lid of the vacuum drawer according to the invention.
Figure 3:
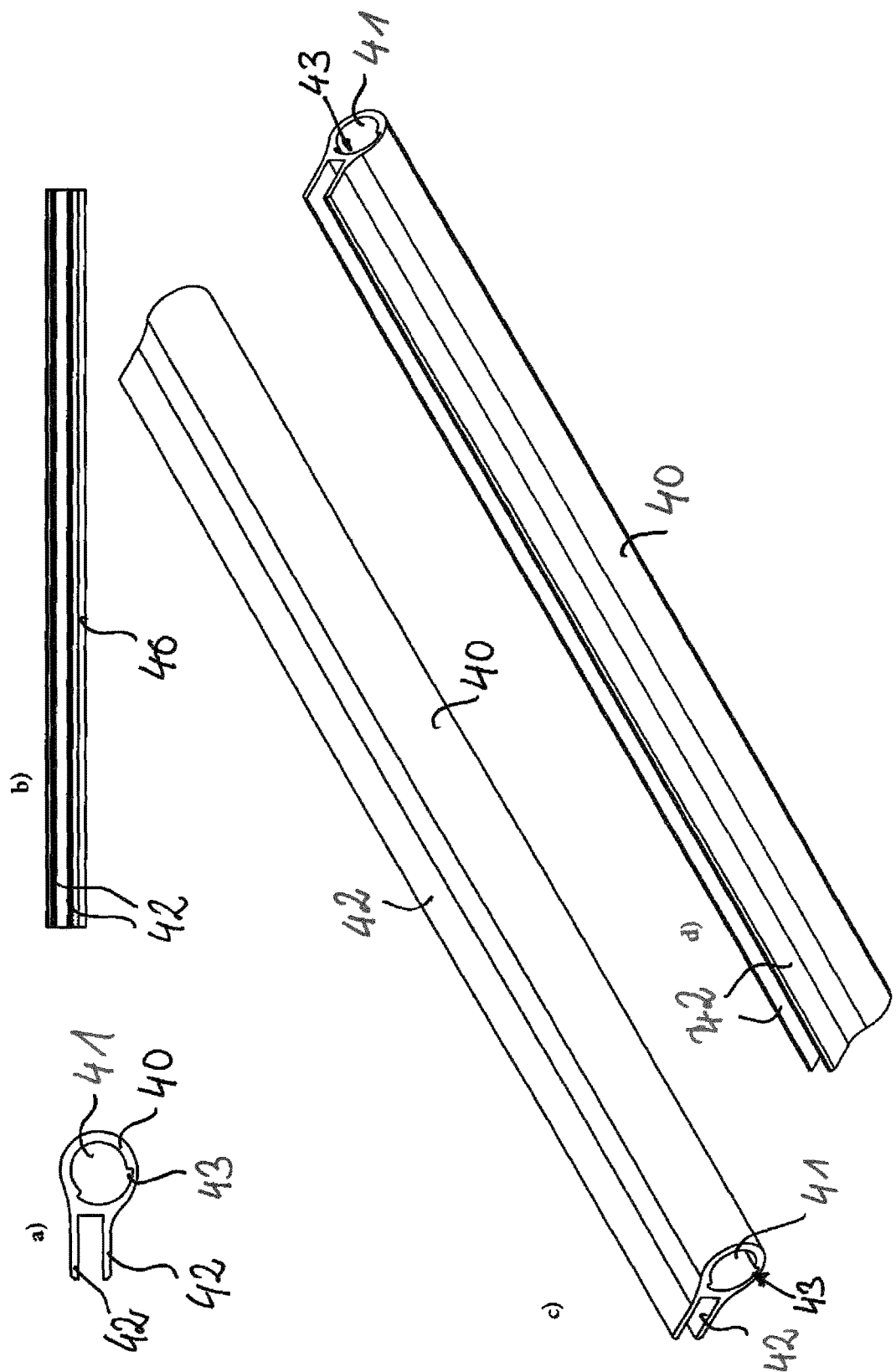
FIG. 3: shows detail representations of the tubular profile for the attachment of the lid part to the drawer body.

FIG. 1 shows a total of four different representations of the vacuum drawer according to the invention. FIG. 1a shows a rear view of the vacuum drawer, FIG. 1b shows a top view of the vacuum drawer, FIG. 1c shows a side view, and FIG. 1d shows a perspective representation of the vacuum drawer. The drawer is suitable for use in a kitchen cabinet, as it is characterized by an installation height of about 140 mm and accordingly corresponds to the standard dimensions of fitted kitchens.

The vacuum drawer comprises a drawer extension 10 which is longitudinally shiftably guided in a drawer body 12 via lateral guide rails. In the illustrated exemplary embodiment the front cover 11 is without handle, the drawer extension is constructed as push-pull device for opening and closing. Within the drawer extension a vacuum chamber 20 is mounted, which is fluidically coupled with a vacuum pump of the vacuum drawer, in order to pump the air out of the closed vacuum chamber 20. The vacuum chamber 20 can be closed airtight by means of the lid 21 pivotally mounted on the chamber 20. The lid 21 itself is fabricated of glass for design reasons.

For sealing an inserted bag a welding bar is used, which extends in the interior of the chamber in pull-out direction of the drawer. A bag filled with foodstuffs is inserted into the chamber for vacuumizing and the lid 21 is closed airtight. After evacuating the chamber, the bag can be sealed by means of the welding bar. For this purpose, the bag opening to be sealed is deposited on the welding bar which after vacuumizing urges the same against a contact point and seals the same by application of heat. The bar can be pressed either to a counterpressure bar attached to the lid 21 or against an alternative contact surface.

Subject-matter of the present invention is the concrete lid construction which is shown in detail in the pictures of FIGS. 2a-2e. FIG. 2a shows a top view of the lid 21, FIG. 2b shows a side view, FIG. 2c shows a sectional representation along the sectional line D-D of FIG. 2a, FIG. 2e shows a perspective side view and FIG. 2d shows a detail representation of the partial region E marked in FIG. 2c.

When using a simple glass plate as lid 21, an implosion can occur in the case of a pane breakage with a vacuum present within the vacuum chamber 20, so that individual glass fragments can be flung out of the vacuum chamber 20 and would constitute a danger for nearby persons. The lid 21 according to the invention therefore is composed of two glass plates 23a, 23b, which are arranged to overlap each other face to face and whose surfaces significantly form the shape of the lid. It can be seen that the outer glass pane 23a is larger in surface area and protrudes beyond all lateral edges of the inner glass pane 23b. When closing the lid, the outer glass plate 23a thereby rests on the edge of the chamber opening of the vacuum chamber 20. The inner glass pane 23b on the other hand is fabricated with a precise fit relative to the chamber opening, so that on closing of the lid the same can slightly be lowered into the chamber space.

Both glass plates 23a, 23b are arranged to be spaced from each other and overlap each other face to face via several spacer profiles 25. The mutual fixation can be effected either by bonding the plates 23a, 23b face to face or by a vacuumized cavity 27 between the glass plates 23a, 23b. A mixture of both fixing variants is of course also possible.

The inner surface of the inner glass plate 23 can be lined in addition, which is indicated in the Figures by the reference numeral 26. This lining also can serve as contact point for the welding bar and can likewise be bonded to the glass plate 23b face to face or point by point.

Due to the spaced arrangement of the glass plates 23a, 23b a groove is obtained at the edge of the lid 21, into which a suitable clamping profile in the form of a sealing lip 24 can be clamped and thereby provides for airtight closing of the vacuum chamber. The sealing lip 24 not only extends into the groove formed between the plates 23a, 23b, but likewise covers the edge of the lining 26.

On a transverse side the lid 21 has a tubular profile 40 for accommodating rotary hinges 50 for pivotally mounting the lid on the chamber body 20. The opposed transverse edge 28 of the lid 21 has rounded corners, wherein both glass plates 23a, 23b as well as the lining 26 are rounded correspondingly.

The tubular profile 40 extends along the entire length of the transverse edge and has openings 41 at its end, in order to introduce exactly one rotary hinge 50 per opening 41 into the profile 40. Individual representations of the profile 40 are shown in FIGS. 4a to 4d, wherein FIG. 4a shows a view of the end face of the profile 40, FIG. 4b shows a front view from the direction of the mountable glass plates 23a, 23b, and FIGS. 4c, 4d show perspective views from above and below.

There is shown the tubular structure of the profile 40 on whose outer circumference two flanks 42 extending in parallel extend and form a groove for accommodating the outer glass plate 23a, so that the transverse edge of the same can be put into the groove with a precise fit. Fixing can be effected by clamping alone or by additional bonding etc.

The tubular profile 40 is open on both sides, so that on the right and left a rotary hinge 50 each can be put into the openings 41. The openings 41 in principle are circular, but provide an additional milled groove 43 for a carrier 53 of the rotary hinge, whereby a a non-rotatable connection between rotary hinge 50 and profile 40 is achieved.

Individual representations of the rotary hinge 50 used are shown in FIGS. 4a, 4b. The construction of the rotary hinges 50 is composed of the shaft 51, at the end of which, i.e. at the shaft end located within the profile 40, a sleeve 52 is mounted on the shaft 51 so as to be rotatable relative to the same. The sleeve 52 comprises a carrier 53 which precisely fits into the milled groove 43 of the opening 41 and thereby ensures a non-rotatable bearing of the sleeve within the opening 41, while the shaft 51 remains rotatable relative to the profile 40. At the opposite shaft end 51 the hinge head 55 with a longitudinal web 56 is seated. By means of the longitudinal web 56 the hinge 50 can be hung into a corresponding tab installed at the chamber body, so that the head 55 is non-rotatably connected with the body, but is hung in releasably for easy lid assembly. On its side facing the opening 41, the hinge head 55 has a ring-shaped formation 57, in order to non-rotatably fix the hinge head 55 on the shaft 51. The sleeve 52 and the formation 57 are connected via the spring 58, so that in the case of a hinge movement or the related relative movement of sleeve 52 and hinge head 55 the spring force of the spring 58 is counteracted or followed. The rotary hinge 50 hence is spring-supported.

The outside diameter of the ring-shaped formation 57 is smaller than the opening diameter of the profile 40, so that the formation 57 can be pushed into the opening 41, until the head 55 strikes against the end face of the profile 40. This results in an axial clearance of the inserted rotary hinges 50, so that the same can easily be hung out of the associated tabs at the chamber body.

To avoid inadvertent hanging out, the slide 60 as shown in FIGS. 5a, 5b, 5c can be put onto the formation 57. When the slide sits on the formation 57, the same no longer can be pushed into the opening 41. Profile 40, hinges 50 and the distance of the tabs is/are dimensioned such that the lid can be hung into the tabs with a precise fit when the slides 60 are put onto the formations 57 on both sides.

The clamp-like slide 60 as shown in FIG. 5 has a handle-like bulge 61 on the back of the slide 60, in order to be able to easily grasp the slide 60 and withdraw it from the formation 57.

The invention claimed is:

1. A vacuum drawer for vacuumizing foodstuffs with a vacuum chamber (20) which is closeable airtight by an actuatable lid (21), wherein
the lid (21) is at least partly made of glass,
the glass part of the lid (21) comprises two or more laminated glass panes (23a, 23b) which overlap each other face to face, with an outer one (23a) of the laminated glass panes (23a, 23b) larger in surface area and protruding beyond all lateral edges of an inner one (23b) of the laminated glass panes (23a, 23b),
the inner and outer glass panes (23a, 23b) are positioned to define a groove (27) therebetween,
several spacer profiles (25) are positioned within the groove (27) to space the inner and outer glass panes (23a, 23b) from one another,
an inner surface of the inner glass pane (23b) opposite the outer glass pane (23a) is lined (26),
a circumferential sealing lip (24) extends into and around the groove (27) formed between the inner and outer glass panes (23a, 23b) and covers an edge of the lining (26),
the sealing lip (24) includes flanges extending around both surfaces of the inner, smaller glass pane (23b) and extending into the groove (27) formed between the two glass panes (23a, 23b) and a groove formed between the inner, smaller glass pane (23b) and the inner liner (26), and
the outer glass pane (23a) configured to completely press against an entire outer edge of an opening of the vacuum chamber (20) and the inner glass plane (23b) configured to be entirely received within the opening of the vacuum chamber (20) and extending into the vacuum chamber (20) upon closing.

2. The vacuum drawer according to claim 1, wherein the glass panes are additionally arranged at a distance to each other by bonding the glass panes, in particular by double-sided adhesive tape of corresponding thickness.

3. The vacuum drawer according to claim 1, wherein the glass panes are bonded to each other face to face, point by point or via an adhesive contour at their edge.

4. The vacuum drawer according to claim 1, wherein between the glass panes a vacuum for fixing the glass panes and/or an inert gas at least partly is provided.

5. The vacuum drawer according to claim 1, wherein the lid is articulated to the vacuum chamber body via at least one rotary hinge.

6. The vacuum drawer according to claim 5, wherein a stationary part of the at least one rotary hinge is releasably accommodated by at least one tab of the chamber body.

7. The vacuum drawer according to claim 6, wherein due to an axial clearance the rotary hinge can be removed from the tab in direction of the rotational axis.

8. The vacuum drawer according to claim 7, wherein a releasable sliding insert is provided in the region of the attachment of the rotary hinge to the lid, to at least partly limit the axial clearance.

9. The vacuum drawing according to claim 5, additionally comprising a tubular profile (40) arranged to receive the hinge (50) and extend along a transverse edge (28) of the lid (21), the profile (40) having openings (41) at opposite ends thereof and flanks (42) extending parallel from an outer circumference thereof to form a groove for receiving the outer glass pane (23a).

10. The vacuum drawer according to claim 9, wherein the hinge (50) is arranged to be received through one of the openings (41) of the profile (40) which are circular and additionally have a milled groove (43),
the hinge (50) is composed of a shaft (51) in turn having, at an end thereof, a sleeve (52) rotatably mounted relative thereto,
the sleeve (52) having a carrier (51) arranged to fit in the milled groove (43) of the respective opening (41) to be non-rotatably fixed in the profile (40) while the hinge shaft (51) remains rotatable with respect to the profile (40),
the hinge (50) also comprising, at an end opposite the sleeve (52), a head (55) in turn having a longitudinal web (56) seated thereon and on a side facing the sleeve (52), a ring-shaped formation (57) arranged to non-rotatably fix the head (55) on the shaft (51), and
a spring (58) interconnecting the sleeve (52) and formation (57).

11. The vacuum drawer according to claim 10, additionally comprising a clamp-like slide (60) arranged to seat around the formation (57) and having a handle-like bulge (61) protruding away from a side thereof arranged to clamp around the formation (57).

12. The vacuum drawer according to claim 1, wherein at the edge of the laminated glass panes a tubular profile is attached, which extends coaxially to the axis of rotation and at its end includes a receptacle for at least one rotary hinge, in particular corresponding receptacles on both sides.

13. The vacuum drawer according to claim 12, wherein the tubular profile comprises two flanks protruding in parallel to form a receptacle for at least one glass pane.

14. The vacuum drawer according to claim 1, wherein corners of a transverse edge (28) of the lid (21) are rounded, together with corners of the inner and outer glass panes (23a, 23b) and lining (26).

15. The vacuum drawer according to claim 1, wherein both said inner and outer panes (23a, 23b) have planar surfaces.

16. A piece of furniture, in particular a kitchen cabinet, comprising the vacuum drawer according to claim 1.

17. A kitchen cabinet comprising a vacuum drawer according to claim 1.

\* \* \* \* \*